A. L. SIMPSON.
DENTAL NAPKIN.
APPLICATION FILED JULY 5, 1910.
983,174.
Patented Jan. 31, 1911.
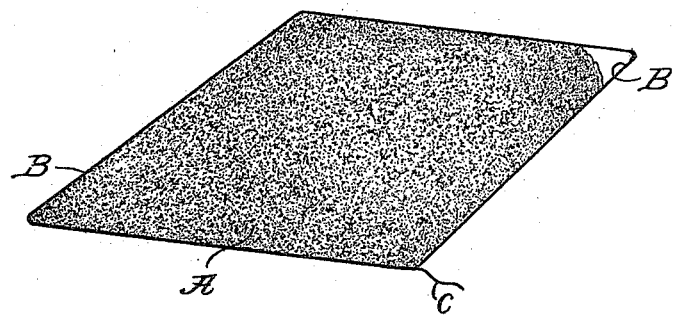
Witnesses
Clayton S. Drew.
A. M. Murray.
Inventor
Albert L. Simpson
By Shepherd & Campbell
Attorneys

UNITED STATES PATENT OFFICE.

ALBERT L. SIMPSON, OF SAN DIEGO, CALIFORNIA.

DENTAL NAPKIN.

983,174.  Specification of Letters Patent.  Patented Jan. 31, 1911.

Application filed July 5, 1910. Serial No. 570,516.

*To all whom it may concern:*

Be it known that I, ALBERT L. SIMPSON, a citizen of the United States of America, residing at San Diego, in the county of San Diego and State of California, have invented certain new and useful Improvements in Dental Napkins, of which the following is a specification.

This invention relates to a dental fabric, the object of the invention being to provide a small napkin made of cloth, paper, or other suitable material, and having a selvage edge or a strand of dental floss. The body of the napkin is to be coated or impregnated with an antiseptic paste or powder. The edge or dental floss may be passed between the teeth in the usual manner of using this floss and the teeth may be brushed with the napkin.

Further objects and advantages of the invention will be set forth in the detailed description which now follows.

The figure shown in the accompanying drawing illustrates a dental napkin constructed in accordance with the invention.

Referring to the drawing, A designates the body of a napkin which may be formed of cloth, paper, or other suitable material and is of a size as to be readily folded and carried in a purse. An edge of dental floss B surrounds the body A and is adapted to be passed between the teeth in the usual manner of use of floss of this kind.

I contemplate coating or impregnating the napkin A with an antiseptic paste, powder, or fluid, or other antiseptic substance.

It will be understood that these napkins may be so cheaply manufactured that they may be thrown away after being used a single time.

These articles will prove a great convenience to travelers, rendering unnecessary the carrying of tooth brushes and dentifrice.

It is not essential that the dental floss extend entirely around the body of the napkin, but it need only extend along one edge. If desired the dental floss may project beyond one corner of the napkin so that the projecting portion designated "C" may be used. Instead of having the dental floss pass entirely around the napkin, it may, if desired, pass only along one edge thereof and the remaining selvage edges of the napkin may be used to be passed between the teeth.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

Having described my invention, what I claim is:

In an article of the character described, a napkin-like body portion and a strand of dental floss secured along one edge of said napkin-like body portion, said strand of dental floss being continued beyond one corner of the napkin-like body portion.

In testimony whereof I affix my signature in presence of two witnesses.

ALBERT L. SIMPSON.

Witnesses:
H. M. VOLLMER,
J. C. HIZAR.